United States Patent [19]

Hambitzer et al.

[11] Patent Number: 5,656,391
[45] Date of Patent: Aug. 12, 1997

[54] LECTROCHEMICAL ALKALI METAL CELL AND PROCESS FOR ITS MANUFACTURE

[76] Inventors: Günther Hambitzer, Steigstrasse 14, D-76327, Pfinztal; Joachim Heitbaum, Friedrichsdorferstrasse 35, D-61352, Bad Homburg, both of Germany

[21] Appl. No.: 446,827

[22] PCT Filed: Dec. 3, 1993

[86] PCT No.: PCT/DE93/01163

§ 371 Date: May 24, 1995

§ 102(e) Date: May 24, 1995

[87] PCT Pub. No.: WO94/14202

PCT Pub. Date: Jun. 23, 1994

[30] Foreign Application Priority Data

Dec. 8, 1992 [DE] Germany ............ 42 41 276.5

[51] Int. Cl.⁶ .................................................. H01M 4/66
[52] U.S. Cl. ...................... 429/162; 429/245; 29/623.5
[58] Field of Search ...................... 29/623.5; 429/162, 429/209, 245

[56] References Cited

U.S. PATENT DOCUMENTS

| | | | |
|---|---|---|---|
| 3,852,113 | 12/1974 | Yokota et al. | 429/209 X |
| 4,302,518 | 11/1981 | Goodenough et al. | 424/104 |
| 4,357,215 | 11/1982 | Goodenough et al. | 209/2.1 |
| 4,668,595 | 5/1987 | Yoshino et al. | 429/194 |
| 5,110,696 | 5/1992 | Shokoohi et al. | 429/623.1 X |
| 5,213,914 | 5/1993 | Heitbaum et al. | 429/197 |
| 5,441,830 | 8/1995 | Moulton et al. | 429/245 X |

FOREIGN PATENT DOCUMENTS

| | | |
|---|---|---|
| 0017400 | 10/1980 | European Pat. Off. . |
| 0357952 | 3/1990 | European Pat. Off. . |
| 0464397 | 1/1992 | European Pat. Off. . |
| 656432 | 2/1938 | Germany . |
| 1025025 | 2/1958 | Germany . |
| 3122080 | 3/1982 | Germany . |
| 3806943 | 9/1988 | Germany . |
| 58-189959 | 11/1983 | Japan . |
| 60-163382 | 8/1985 | Japan . |

*Primary Examiner*—Stephen Kalafut
*Attorney, Agent, or Firm*—Sprung Horn Kramer & Woods

[57] ABSTRACT

Electromechanical alkali metal cell with a positive electrode (6), which has a metal substrate (4) and an active mass (5) connected to the substrate, the active mass (5) containing a complex metal oxide with the general formula $A_xM_yO_z$, in which A denotes the alkali metal, M a transition metal and O oxygen. With simple manufacture high long-term stability of such an electrode is achieved by the fact that the positive electrode (6) is a composite electrode, in which the active mass (5) is connected without an organic binder directly to the substrate (4), the active mass and its connection to the substrate being produced by heating an electrode base containing the transition metal M in contact with an inorganic compound of the alkali metal with conversion of a surface layer of the base with the alkali metal compound to the complex metal oxide (FIG. 4).

23 Claims, 2 Drawing Sheets

LECTROCHEMICAL ALKALI METAL CELL AND PROCESS FOR ITS MANUFACTURE

The invention relates to an electrochemical alkali metal cell, in particular for rechargeable alkali metal storage batteries. In alkali metal cells alkali metal ions form the species carrying the current, both electrodes and the electrolyte as electrochemically active substance containing the alkali metal A.

Furthermore, the invention is based on a process for manufacture of such an electrochemical cell and a process for manufacture of a separator layer on an electrode for such an electrochemical cell.

Electrodes for electrochemical cells must meet high requirements. In particular a high current density should be made possible by high mobility of the species formed in the electrode reaction. A particular problem results from the fact that the insertion of the species formed leads to changes in volume and that the electrode structure should ensure that a long life and a high number of charging and discharging cycles can be achieved despite these changes in volume. This problem arises in particular with regard to the positive electrode. The ability of the electrode to store as much alkali metal ions as possible and release it again reversibly is determinative for the capacity of a storage battery cell.

One approach to a solution of this problem, on which the main feature of the present invention is also based, is described in EP-A-0017400. An intercalated compound with the general formula $A_xM_yO_z$ is described as the active mass of the positive electrode. It is used in conjunction with a negative electrode, the active substance of which is the alkali metal A. A is preferably lithium and M cobalt, nickel or iron. Insofar as reference is made below to these substances as examples of A and M, this is done without restriction of the general concept.

The function of the positive electrode is based on the incorporation of the lithium in the matrix of the metal oxide. x is accordingly less than 1, the value x=0 not being achieved in practice. Because of varying proportions of impurities, x and y generally also do not have precisely integral values. Insofar as active masses are designated here by their formula, the specified integral indices should be understood with this reservation.

In practice the ion-conducting active mass of an electrode must be electrically connected to a substrate, which serves as an electron conducting discharge element. The substrate is generally a metal sheet or grid. Generally it simultaneously serves for mechanical securing of the active mass. To achieve this connection, the active mass is often mixed in ground form with organic binders, in particular those based on fluorocarbons (Teflon, Tefzel), and pressed on to the substrate. Often carbon is added to improve the electrical conduction properties. This method is described for different active masses in DE-A-31 22 080 and in particular for $LiCoO_2$ in EP-A-0 357 952.

The invention aims to improve electrochemical alkali metal cells with a positive electrode based on a complex metal oxide with the general formula $A_xM_yO_z$ in that long-time stability of the electrodes and thus inexpensive production and long life of the cells are achieved with simple manufacture.

This problem is solved by an electrochemical alkali metal cell with a negative electrode containing an alkali metal A, an electrolyte containing the alkali metal A and a positive electrode which has a metallic substrate and an active mass connected to the substrate, the active mass containing a complex metal oxide with the general formula $A_xM_yO_z$ in which A denotes the alkali metal, M a transition metal and O oxygen, wherein the positive electrode is a composite electrode, in which the active mass is connected without any organic binder directly to the substrate, the active mass and its connection to the substrate being produced at the same time in one operation by heating an electrode base containing the transition metal M to a glowing status in contact with an inorganic Compound of the alkali metal whereby a surface layer of the base is converted with the alkali metal compound to the complex metal oxide.

The transition metal M is preferably an element with an atomic number between 22 and 28, in particular cobalt.

The electrode base, from which the composite electrode is manufactured by heating in contact with an inorganic compound of the alkali metal, is a solid (not powdered) metal part extending twodimensionally, its shape before heating corresponding essentially to the required shape of the electrode. Generally the electrode base preferably has a large surface area and a small thickness, e.g. like a foil, a sheet or a grid.

The electrode base may contain the transition metal M in a homogeneous distribution. Such a homogeneous electrode base is heated in contact with the alkali metal compound until a surface layer of the complex metal oxide is formed, the thickness of which is adequate to form an active mass for the required electrical capacity of the cell. In this way an electrode is produced, in which the substrate contains the same transition metal M as the complex metal oxide.

The electrode base may also consist of two or more metallic layers of different composition, which are joined to each other by a metallic bond. For example, metallic cobalt can be applied to a nickel sheet, foil or grid (e.g. by electrodeposition). In this case the heating process can be carried out in contact with the inorganic alkali metal compound until the transition metal M of the coating (i.e. the cobalt in this example) is fully converted into the complex metal oxide. An electrode is thus produced, in which the metal of the substrate is different from the transition metal in the complex metal oxide.

In each of the two above-mentioned cases a surface layer of the electrode base is converted into the active mass, while the unconverted part forms the substrate of the composite electrode.

With a given electrode area the thickness of the layer of the complex metal oxide is determinative for its ability to store alkali metal ions into the matrix of the active mass. Hence in most applications a relatively large layer thickness of the active mass (at least about 10 μm, preferably in the order of 100 μm) is desirable.

The binding between the substrate and the complex metal oxide in the composite electrode is free of a binding agent in the sense that it is effected without an additional organic binder. The entire electrode preferably does not contain any organic binders when ready for use.

A process, in which a nickel electrode is heated in contact with a lithium compound at temperatures between 500° and 1000° C., is known from German Examined Patent Application (Auslegeschrift) 1 025 025. It relates in particular to sintered electrodes for gas elements, which have a finely porous structure with two different porosities, the electrode side facing the electrolyte having coarser pores than the gas side of the electrode. To protect such electrodes against corrosion by the alkaline electrolytic liquids used in gas elements, they were provided with a thin nickel oxide coating. However, this caused an increase in the electrical resistance, which interfered with the function of the element. In this patent publication heating with the lithium compound is proposed in order to thereby increase the conductivity of the electrode.

In contrast to this literature reference the present invention does not relate to the application of a protective layer, which should be as thin as possible in order not to endanger the function of the element, but to the production of an active mass from an intercalation metal oxide, which must have the greatest possible layer thickness to ensure an adequate cell capacity. The operating conditions and stressing of the electrode are in the present invention fundamentally different from the case of the German specification.

In the method of the invention the alkali metal A is a constituent of a reagent layer which is applied in powdered or liquid form to the electrode base (e.g. by spraying, immersion or spreading) before the heating. The reagent layer preferably consists of a suspension which contains the alkali metal compound in a concentration far in excess of its solubility, so that solid particles of the alkali metal compound are present in the suspension. In the context of the invention it was found that despite the necessarily irregular structure of such a suspension an adequately uniform and homogeneous layer of the complex metal oxide results during heating which is characterised firstly by extremely good strength and fixation to the substrate and, secondly, by a microporous structure facilitating the incorporation of the lithium ions in the matrix of the metal oxide and thus permitting high current densities.

The electrochemical cells according to the invention are suitable in particular for operation at room temperature. Hence the organic additives hitherto preferred because of their good bonding properties and elasticity would be entirely suitable for use in the positive electrode. Surprisingly, however, it has been found in the context of the present invention that a composite electrode without any organic binders or carbon at all has good long-time stability and allows high numbers of cycles. In addition it is characterised by excellent compatibility under the most difficult conditions.

The starting materials and process conditions for manufacture of the positive electrode can be selected by the skilled person on the basis of the information given here. In particular the following should be noted.

The invention was so far tested essentially with lithium cells, in which the alkali metal A in the complex metal compound is likewise lithium. However, it should be assumed that the method of the invention can also be successfully used with other alkali metals, in particular sodium and potassium.

With regard to the transition metal M, cobalt, nickel and iron as well as their alloys are of special interest. In the practical testing of the invention the best results have so far been achieved with cobalt or cobalt-based alloys. The complex metal compound in such cases is lithium cobalt oxide.

The inorganic alkali metal compound, which is applied as the reagent to the electrode base before the heating process required for formation of the active mass, preferably contains oxygen. In particular lithium carbonate ($Li_2CO_3$), lithium oxide ($Li_2O$) and lithium hydroxide (LiOH) were tested in practice, but other alkali metal compounds containing oxygen should also be suitable, i.e. $LiNo_3$. The suitability of a compound for this purpose can be checked by simple tests. Impurities in the complex metal oxide produce slight deviations from the exact stoichiometric ratio. The starting materials used and the process parameters during heating should be selected in such a way that a complex metal oxide of relatively high purity results. In the case of lithium cobalt oxide the value of y should be between 0.9 and 1.1 and the value of z between 1.9 and 2.1. x determines the charge of the cell and generally has a maximum value of 1.

Heating preferably takes place at relatively high temperatures in the order of 800° to 1100° C. and in an atmosphere containing oxygen, advantageously in air.

In the electrochemical cell according to the invention preferably an inorganic electrolyte based on a complex solution of lithium tetrachloraluminate ($LiAlCl_4$) in sulphur dioxide ($SO_2$) is used in conjunction with a lithium electrode, A being lithium in this case. In this respect reference is made to the above-mentioned EP-A-0 357 952.

Important advantages of the invention can be summarised as follows:

The troublesome generation of chlorine which is found with carbon-based electrodes in combination with chloride-based electrolytes is almost totally avoided, as is explained in more detail below.

Manufacture is relatively simple. In particular the risk of cancer, which was associated with the processing of finely ground powder in the conventional manufacture of electrodes, is avoided.

Strength and conductivity are better than in the known electrodes containing Teflon and graphite.

There is a better possibility of reuse (recycling), because Teflon need not be used.

According to a further important aspect the invention is directed to a process for the manufacture of a separator layer on electrodes. This method can be used in particular for composite electrodes manufactured according to the method already described. However, it can also be used in other cases, provided that the electrodes do not contain organic binders or other organic substances, which are impaired by high temperatures.

This process is characterised by the application of a ceramic or vitrifying substance to the electrode surface and heating of the electrode with the applied substance in such a way that a continuous fine-pored top layer is formed on the electrode surface.

Alkali metal batteries operated at room temperature usually have separators made of microporous plastics, in particular fluorocarbopolymers. However, separators of this type give rise to stability problems, in particular with regard to chemical stability in the presence of lithium and chlorine. Attempts have been made to avoid these stability problems by additionally interposing a glass fibre mat between the negative lithium electrode and the separator. However, even in this way satisfactory operational reliability cannot be achieved.

The search for suitable materials and designs for a separator is attended by considerable problems, because the separator has to meet difficult and sometimes conflicting requirements.

On the one hand, the electrolyte resistance should be as small as possible. This results in a requirement for the highest possible porosity of the separator. On the other hand, however, large pores lead to a non-homogeneous concentration distribution of the active species during the operation of the electrochemical cell with the current flowing. This accelerates the deposition of alkali metal in the form of dendrites. In this respect there is a desire for a small pore diameter, preferably less than 1 μm.

The chemical stability has to meet demanding requirements, because strongly reactive substances such as alkali metals, halogens and their compounds often have to be used in electrochemical cells. These sometimes chemically attack even special polymer materials which are well-known for their chemical resistance. Finally, the separator should have such a mechanical stability that it does not fracture even under load and prevents penetration by alkali metal dendrites.

Despite these exceptional requirements a separator should be thin and light, so as to keep the cell weight as low as possible.

Glass, silica sols or refractory oxides such as aluminum oxide (e.g. as mullite or in the form of fibres) or zirconium oxide and the like are suitable as vitrifying or ceramic substances. Such substances have extremely high chemical resistance. The required porosity of the ceramic or vitrifying substance can be produced by a number of different measures during application and heating.

Technologically it is relatively simple to apply and sinter the ceramic or vitrifying substance in the form of fibres or powder with a suitable particle size (mean particle diameter typically in the order of 1 μm), the temperature and time during the sintering process being such that the layer retains adequate microporosity. This heating process preferably takes place in a controlled oxygen-reduced in an atmosphere, i.e. atmosphere with a lower oxygen concentration than air. In particular it can take place entirely in an inert gas atmosphere, i.e. with practically complete exclusion of oxygen.

Alternatively, soluble vitrifying or ceramic substances can also be applied in dissolved form to produce a homogeneous layer, which is converted to a chemically stable form during heating. To achieve adequate microporosity of this layer a substance can be added, which is dissolved out, e.g. by washing with water, after heating. Alternatively, additives which escape in gaseous form during heating and thus produce the required porosity can also be used.

The invention is explained in more detail below with reference to an exemplified embodiment shown in the figures.

Figure 1:
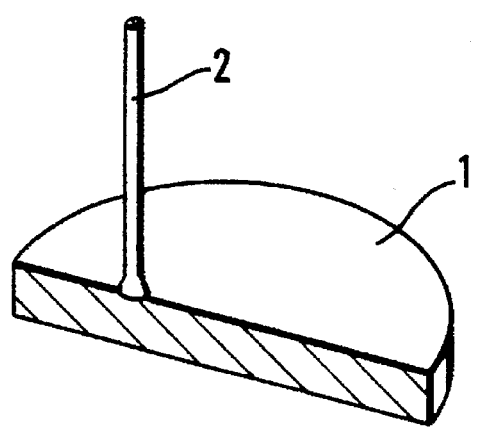
FIGS. 1 to 3 show the process for manufacture of a composite electrode in three different stages in perspective and partially as sectional views.

FIG. 1 shows an electrode base 1 suitable for manufacture of a composite electrode according to the invention and consisting of the metal M. In the case shown in the figure it takes the form of a circular thin plate. A metal wire 2 is secured by spot welding to the base 1.

Figure 2:
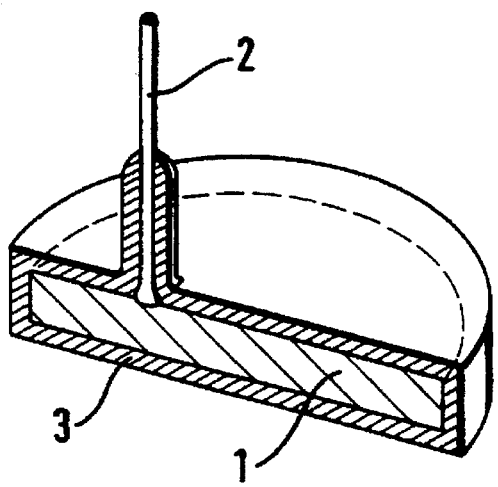

A reagent layer 3 of an inorganic alkali metal compound is applied to the electrode base 1 (FIG. 2). The layer 3 should cover the entire base 1 and the attachment of the connecting wire 2.

Figure 3:
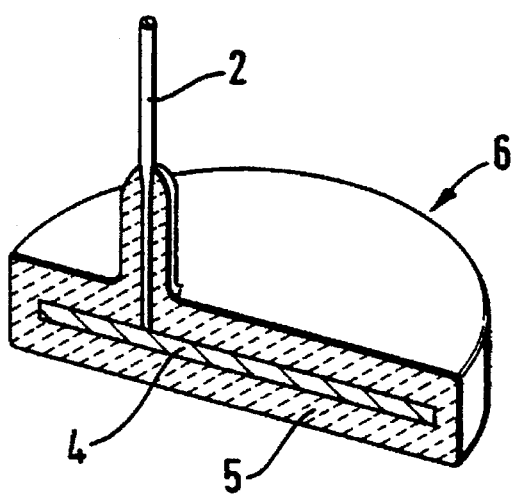

The electrode base 1 coated with the reagent layer 3 is heated in air to a glowing status, while it is advantageously held by the wire 2. The inorganic alkali metal compound A reacts with the metal M of the substrate with formation of the complex metal oxide $A_xM_yO_z$. The result is shown in FIG. 3. A core remains, which forms the (electronically conductive) substrate 4 and consists of the metal M. It is covered by an (ionically conductive) layer of the complex metal oxide ($LiCoO_2$ in the example), which forms the active mass 5 of the electrode 6. The relative thickness of the substrate 4 on the one hand and of the layer 5 on the other is dependent on the temperature and duration of the heating process. The composite electrode 6 should preferably have a metal core on almost its entire surface, because this improves both the mechanical stability and the electrical conduction properties. The active mass 5 is compact and adheres well to the electronically conductive substrate.

The metallic electrode base 1 can, of course, be manufactured in various outer shapes. Depending on the required electrode shape, a wire or reticular structure can also be used in place of the illustrated plate-type base punched out of a metal sheet. The electrode base preferably consists of the pure metal M or an alloy of transition metals (in particular metals with atomic numbers between 22 and 28). The proportion of other admixtures should be small (less than 10%).

Various methods are also possible for the application of the reagent layer. The concentration of the inorganic alkali metal compound should be considerably higher than the solubility limit. It can be used, for example, in the form of an aqueous suspension or a melt, which is applied to the electrode base (e.g. by spraying) or into which the electrode base is dipped.

The inorganic alkali metal compound is preferably applied in a defined quantity. The degree of conversion can be adjusted by this quantity as well as by the time and temperature of the heat treatment, the heating time being variable in a wide range between about one minute and one hour, depending on the thickness of the reagent layer. The heating time required for an adequate layer thickness of the active mass also depends heavily on the transition metal M. For example, cobalt is converted considerably faster than nickel.

If a large quantity of alkali metal compound has to be applied for manufacture of an electrode with a relatively large electrode mass, the process (application of the reagent, heating) can be repeated once or several times. In the case of a homogeneous base made from the transition metal M or an alloy containing the transition metal M the process is interrupted when the original substrate is largely but not yet fully converted. A maximum of about 95% of the original substrate is preferably converted.

Another metal salt, in particular a salt of aluminum, boron or tin, can be added in a small concentration of less than 5% to the alkali metal containing salt, in order to increase the conductivity of the active mass formed during the heating (U.S. Pat. No. 4,668,595).

As already mentioned, the electrode base 1 can also be a multi-layer design, with only the top layer containing the transition metal M of the complex metal oxide. In this case preferably the entire layer containing the metal M is converted.

Excess alkali metal compound remaining after heating is removed by washing (e.g. with water or diluted acid).

According to a specially preferred embodiment of the method according to the invention, the mechanical stability of the electrode is improved by the application of a strength-increasing inorganic substance in an additional strengthening step after the heating followed by a further heating step. As in the above-mentioned production of a separator layer, heating is again preferably performed in a controlled oxygen-reduced atmosphere.

In particular, the vitrifying or ceramic substances such as silica sols, glass and aluminum oxide as well as mixtures of these substances already mentioned above for manufacture of the separator layer are suitable as the strength-increasing substance. It may be advisable to additionally add an inorganic compound of the alkali metal, basically the same compounds as in the manufacture of the complex metal compound being suitable. The mixtures may be applied dry or as an aqueous solution or suspension, and a surfactant should be added to reduce the surface tension. Spreading, coating or dipping can again be used as application methods. The temperature in the second heating step is preferably higher than in the first heating step (1100° C. is a typical value), while the time for the second heating step is preferably considerably shorter than that of the first one and is typically less than 10 minutes.

The additional treatment of the composite electrodes with a strength-increasing substance not only improves the mechanical strength, but also leads to a reduction of chlorine generation in the particularly preferred application in combination with an electrolytic solution containing chloride.

The formation of chlorine at the positive electrode in a cell with an electrolyte containing chloride and operating at a high cell voltage, in particular the system Li/LiAlCl$_4$•SO$_2$/LiCoO$_2$ described in EP-A-O 357 952, is a secondary reaction, which has positive effects on the one hand and negative effects on the other.

On the one hand, it forms effective overcharging protection. The chlorine gas formed at the positive electrode dissolves in the electrolyte and migrates to the negative lithium electrode, where the starting substance lithium chloride is formed. Consequently the charging current above a limit voltage is consumed by a secondary reaction which does not lead to a net effect.

On the other hand, this reaction also takes place on a noteworthy scale in the normal operating voltage range of the element (in the voltage range above about 4.3 V in the specified system) because of the thermodynamic conditions. It thus forms an interfering self-discharge reaction. Hence it is important to reduce the chlorine generation to a level which is no longer troublesome. This is achieved by the specified strengthening step.

Figure 4:
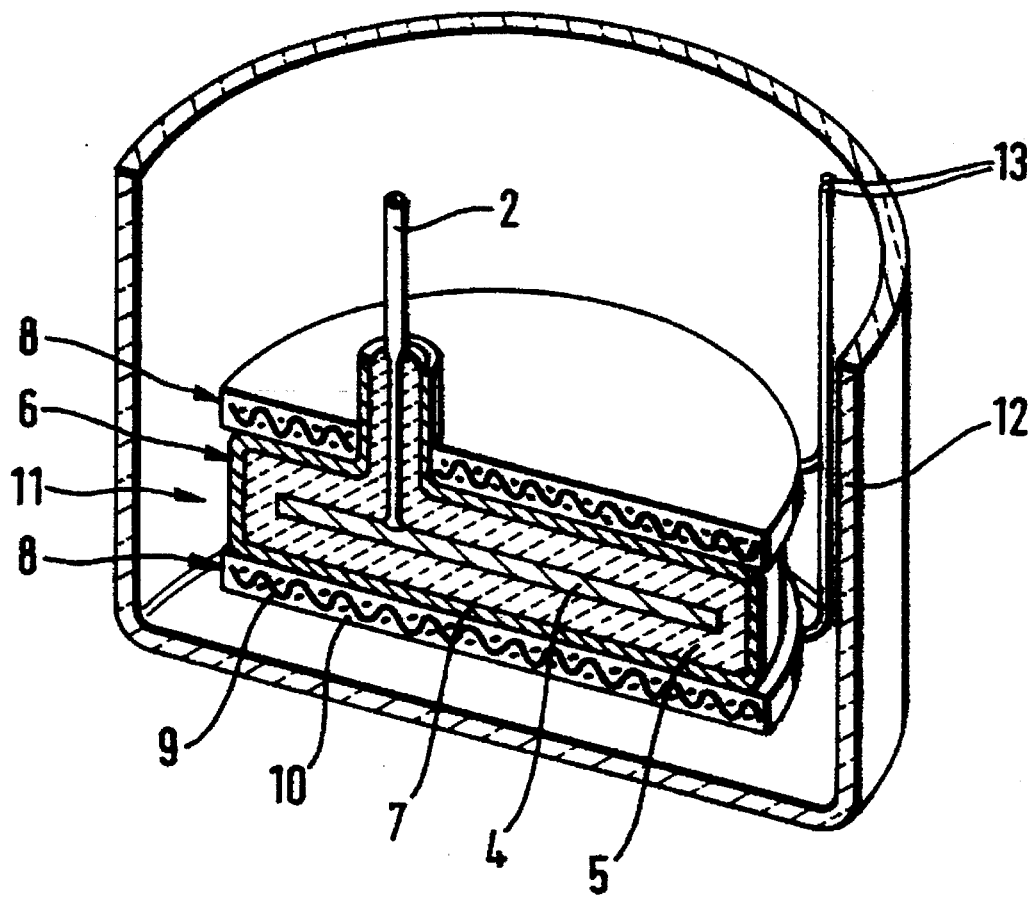
FIG. 4 shows an electrochemical cell in perspective and partially as a sectional view.

FIG. 4 shows the lower part of an electrochemical cell according to the invention. The composite electrode 6 is covered by a separator layer 7, a negative electrode 8 following on both sides of the (positive) composite electrode 6, so that a sandwich-type construction results. Both negative electrodes 8 consist of a supporting grid 9 and the alkali metal 10 pressed on it.

The electrode sandwich construction designated overall as 11 is located in a container 12 made of glass or a suitable inert metal, only the lower part of which is shown in the figure. The electrical connection, which is made via the wire 2 and the wires 13 connected to the negative electrode, is likewise not shown in detail.

The invention is explained in more detail below with reference to examples.

EXAMPLE 1

A composite electrode was manufactured in the way explained on the basis of FIGS. 1–3. A cobalt sheet 0.1 mm thick and 10 mm in diameter served as the electrode base. It was coated with a reagent layer in the form of a suspension of lithium carbonate (80% by weight, in water) with a quantity of 20 mg lithium carbonate per cm$^2$. Heating was subsequently carried out in air at 900° C. for about one hour.

The resulting cobalt/lithium cobalt oxide composite electrode was washed with diluted acid and installed in a test cell, the construction of which essentially conformed to FIG. 4. The active mass of the negative electrode was lithium. LiAlCl$_4$ SO$_2$ with an equivalence ratio of 1:3 was used as the electrolytic solution.

The electrode manufactured in this way had a capacity of 13 mAh per cm$^2$ electrode surface when charging up to 4.5 V (corresponding to a charge of about 85%) and discharging down to 3.5 V.

EXAMPLE 2

To increase the strength of the electrode and its resistance to the volume changes occurring during charging and discharge and at the same time to reduce the chlorine generation, which was observed to an increasing extent above 4.3 V, the composite electrode manufactured according to example 1 was coated with an aqueous paste of a heat-resistant glass powder (DURAN, manufacturer Messrs. Schott, Mainz, Germany) with a mean particle diameter of 7 μm and 1% polyethylene glycol (as surfactant). The increase in weight of the dried electrode was about 10 mg/cm$^2$. This was followed by heating at 1100° C. for 3 minutes, washing in boiling water and drying.

In this way a separator layer characterised by high chemical resistance and mechanical strength was produced on the electrode. Thus the risk of a short-circuit by lithium dendrites produced after a high number of cycles is largely prevented.

At the same time an extremely high electrical power density is achieved. Current coverage (previously customary designation "current density") of 10 mA/cm$^2$ at 3.1 V was measured.

EXAMPLE 3

The experiments according to example 2 were repeated, but with the viscosity adjusted (by increasing the polyethylene glycol concentration to 5% and the addition of silica sol diluted 10 fold) to a value which allows application of the reagent layer by dipping. The results were similar to the preceding example.

We claim:

1. An electrochemical alkali metal cell with a negative electrode the active substance of which is an alkali metal, an electrolyte containing the alkali metal and a positive electrode having a metallic substrate and an active mass connected to the substrate, the active mass containing a complex metal oxide containing an alkali metal and a transition metal, wherein.

the positive electrode is a composite electrode with direct connection of the active mass to the substrate without an organic binder, wherein the active mass and connection to the substrate are produced by heating an electrode base containing the transition metal at least in a surface layer thereof in contact with an inorganic compound of the alkali metal to convert the surface layer of the base with the alkali metal compound to the complex metal oxide and wherein an unconverted portion of the base forms the substrate.

2. The alkali metal cell according to claim 1, wherein the substrate contains the same transition metal as the metal oxide of the active mass.

3. The alkali metal cell according to claim 1, wherein the transition metal is an element with an atomic number between 22 and 28.

4. The alkali metal cell according to claim 3, wherein the transition metal is cobalt.

5. The alkali metal cell according to claim 1, wherein the alkali metal is lithium.

6. In a process for manufacturing an electrochemical alkali metal cell including a negative electrode the active substance of which is an alkali metal, an electrolyte containing the alkali metal and a positive electrode having a metallic substrate and an active mass connected to the substrate, wherein the active mass contains a complex metal oxide containing an alkali metal and a transition metal, wherein the positive electrode is made by: coating an electrode base containing the transition metal at least in a surface layer thereof with a reagent layer which contains an inorganic compound of the alkali metal; and heating the coated base to form a composite structure by converting the surface layer of the electrode base with the alkali metal compound into the complex metal oxide.

7. The process according to claim 6, wherein the heating takes place in the presence of oxygen.

8. The process according to claim 6, wherein the alkali metal compound of the reagent layer is a compound containing oxygen.

9. The process according to claim 8, wherein the compound is a carbonate, a nitrate or a hydroxide.

10. The process according to claim 6, wherein at least 90% of the surface layer of the electrode base converted during heating consists of the transition metal or of an alloy of several transition metals.

11. The process according to claim 6, wherein the heating takes place at a temperature of more than 800° C.

12. The process according to claim 6, wherein a strength-increasing inorganic substance is applied to a surface of the electrode base after the heating and thereafter a second heating step is performed.

13. The process according to claim 12, wherein the second heating step after application of the strength-increasing inorganic substance takes place in an atmosphere with a reduce oxygen content compared to air.

14. The process according to claim 12, wherein the second heating step after application of the strength-increasing inorganic substance takes place at a higher temperature compared to the preceding heating for formation of the complex metal oxide.

15. In a process for manufacturing an electrochemical alkali metal cell including a negative electrode the active substance of which is an alkali metal, an electrolyte containing the alkali metal and a positive electrode which has a metallic substrate and an active mass connected to the substrate and is free from organic binders, wherein the active mass contains a complex metal oxide containing an alkali metal and a transition metal, wherein a separate layer on said positive electrode is made by: coating said electrode with a ceramic or vitrifying substance, and heating the coated base to form a continuous finely porous separator layer on a surface of the electrode.

16. The alkali metal cell according to claim 1, wherein the active mass surface layer has a thickness of at least 10 μm.

17. The alkali metal cell according to claim 16, wherein the active mass surface layer has a thickness of on the order of 100 μm.

18. A process for manufacturing an electrochemical cell including a negative electrode, an electrolyte and a positive electrode, wherein at least one of said electrodes contains no organic substance and wherein the making of said cell comprises a step in which a separator layer on said at least one of said electrodes not containing organic substances is formed by coating the electrode with a ceramic or vitrifying substance and heating the coated electrode to form a continuous finely porous separator layer on a surface of the electrode.

19. The process according to claim 18, wherein the ceramic or vitrifying substance is selected from the group comprising glass, silica sols and refractory oxides.

20. The process according to claim 19, wherein the refractory oxide is aluminum oxide or zirconium oxide.

21. The process according to claim 18, wherein the ceramic or vitrifying substance is applied in the form of fibres.

22. The process according to claim 18, wherein the ceramic or vitrifying substance is applied as a powder.

23. The process according to claim 18, wherein the ceramic or vitrifying substance is applied in dissolved form.

* * * * *